(12) United States Patent
Koo

(10) Patent No.: US 9,010,973 B2
(45) Date of Patent: Apr. 21, 2015

(54) MOTOR VEHICLE HEADLIGHT POSITIONING DEVICE

(75) Inventor: Ting-Yi Koo, Chang Hua County (TW)

(73) Assignee: Tricore Corporation, Chang Hua County (TW)

( * ) Notice: Subject to any disclaimer, the term of this patent is extended or adjusted under 35 U.S.C. 154(b) by 54 days.

(21) Appl. No.: 13/439,963

(22) Filed: Apr. 5, 2012

(65) Prior Publication Data

US 2013/0265792 A1    Oct. 10, 2013

(51) Int. Cl.
*B60Q 1/00* (2006.01)
*B60Q 1/076* (2006.01)

(52) U.S. Cl.
CPC ..................................... *B60Q 1/076* (2013.01)

(58) Field of Classification Search
CPC ...... B60Q 1/10; B60Q 1/12; B60Q 2300/324; B60Q 2300/122; B60Q 1/076
USPC ......... 362/418–420, 427–428, 459–468, 507, 362/523–526
See application file for complete search history.

(56) References Cited

U.S. PATENT DOCUMENTS

| | | | |
|---|---|---|---|
| 6,478,457 B1 * | 11/2002 | Manley | 362/465 |
| 6,882,073 B2 | 4/2005 | Suzuki et al. | |
| 7,140,758 B2 | 11/2006 | Suzuki et al. | |
| 7,223,001 B2 | 5/2007 | Pfister et al. | |
| 2002/0043880 A1 | 4/2002 | Suzuki et al. | |
| 2004/0165395 A1 * | 8/2004 | Suzuki et al. | 362/465 |
| 2005/0046291 A1 | 3/2005 | Suzuki et al. | |
| 2008/0175000 A1 * | 7/2008 | Johnson et al. | 362/265 |
| 2010/0014301 A1 * | 1/2010 | Demarois | 362/418 |
| 2010/0091512 A1 * | 4/2010 | Watanabe et al. | 362/523 |

* cited by examiner

*Primary Examiner* — David V Bruce
*Assistant Examiner* — Gerald J Sufleta, II
(74) *Attorney, Agent, or Firm* — Bacon & Thomas, PLLC

(57) ABSTRACT

A motor vehicle headlight positioning device consisting of a holder base, a headlight support, a step motor, a movable member and a swivel arm is disclosed. The headlight support is pivotally mounted in the holder base to hold a motor vehicle headlight. By means of the rotation of an output screw of the step motor to move the movable member linearly, the headlight support is rotatable by the movable member and the swivel arm to adjust the projecting direction of the motor vehicle headlight. As the output screw is rotated on its own axis and the output screw is supported in a support block of the holder base, the displacement stability of the movable member is enhanced.

5 Claims, 4 Drawing Sheets

MOTOR VEHICLE HEADLIGHT POSITIONING DEVICE

BACKGROUND OF THE INVENTION

1. Field of the Invention

The present invention relates to a motor vehicle headlight technology that allows adjustment of the projecting direction of the headlight, and more particularly, to a motor vehicle headlight positioning device, which uses a step motor to achieve adjustment of the projecting direction of the headlight.

2. Description of the Related Art

A conventional vehicle headlight positioning design, for example, the vehicle headlight positioning device of U.S. Pat. No. 7,223,001, includes a headlight support and a linear actuator. The actuator has an electric stepping motor, a coupling part and a linear-movement screw connecting between the motor and the coupling part. The headlight support has a coupling end inserting into a cavity of the coupling part. Thus, when the screw is moved axially by the motor, the headlight support is oscillated by the coupling part to adjust the projecting direction of the headlight.

However, the aforesaid prior art design does not provide means to support axial positioning of the linear-movement screw, the linear-movement screw may vibrate heavily when extended out to the extent, affecting displacement stability.

SUMMARY OF THE INVENTION

The present invention has been accomplished under the circumstances in view. It is the main object of the present invention to provide a motor vehicle headlight positioning device, which uses a screw rod to rotate on its own axis for the transmission of a driving force without axial displacement, assuring enhanced displacement stability of other component parts.

To achieve this and other objects of the present invention, a motor vehicle headlight position device comprises a holder base, a headlight support, a stepping motor, a movable member and a swivel arm is disclosed. The headlight support is pivotally mounted in the holder base to hold a motor vehicle headlight. The stepping motor is mounted in the holder base, comprising an output screw for outputting a rotary driving force. The output screw is rotatably mounted in the stepping motor and prohibited from an axial movement. The movable member comprises a body meshed with the output screw, and a connection portion extended from the body. The swivel arm comprises a first end affixed to the headlight support, and a second end coupled to the connection portion of the movable member.

Further, the holder base comprises a support block, and a locating hole located on the support block. The output screw comprises a front bearing end portion rotatably inserted into the locating hole of the support block of the holder base. Further, the swivel arm comprises a coupling hole located on the second end. The connection portion of the movable member is an axle received in the coupling hole. Further, the coupling hole of the swivel arm is an elongated hole. Further, the motor vehicle headlight position device comprises a spring member sleeved onto the output screw and stopped between the support block of the holder base and the body of the movable member, and a position sensor mounted in the holder base and adapted for sensing the position of the movable member in said holder base.

DETAILED DESCRIPTION OF THE INVENTION

Figure 1:
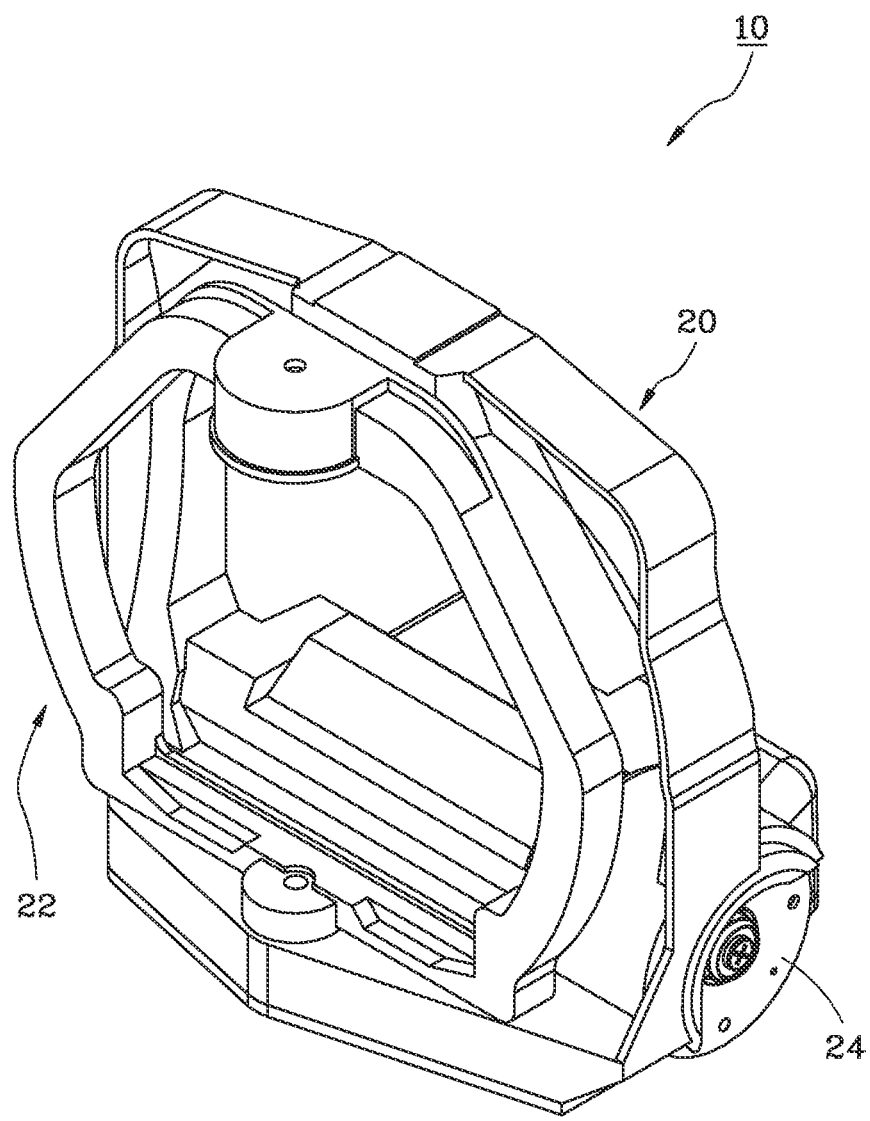
FIG. 1 is an devotional view of a motor vehicle headlight positioning device in accordance with a first embodiment of the present invention.
Figure 2:
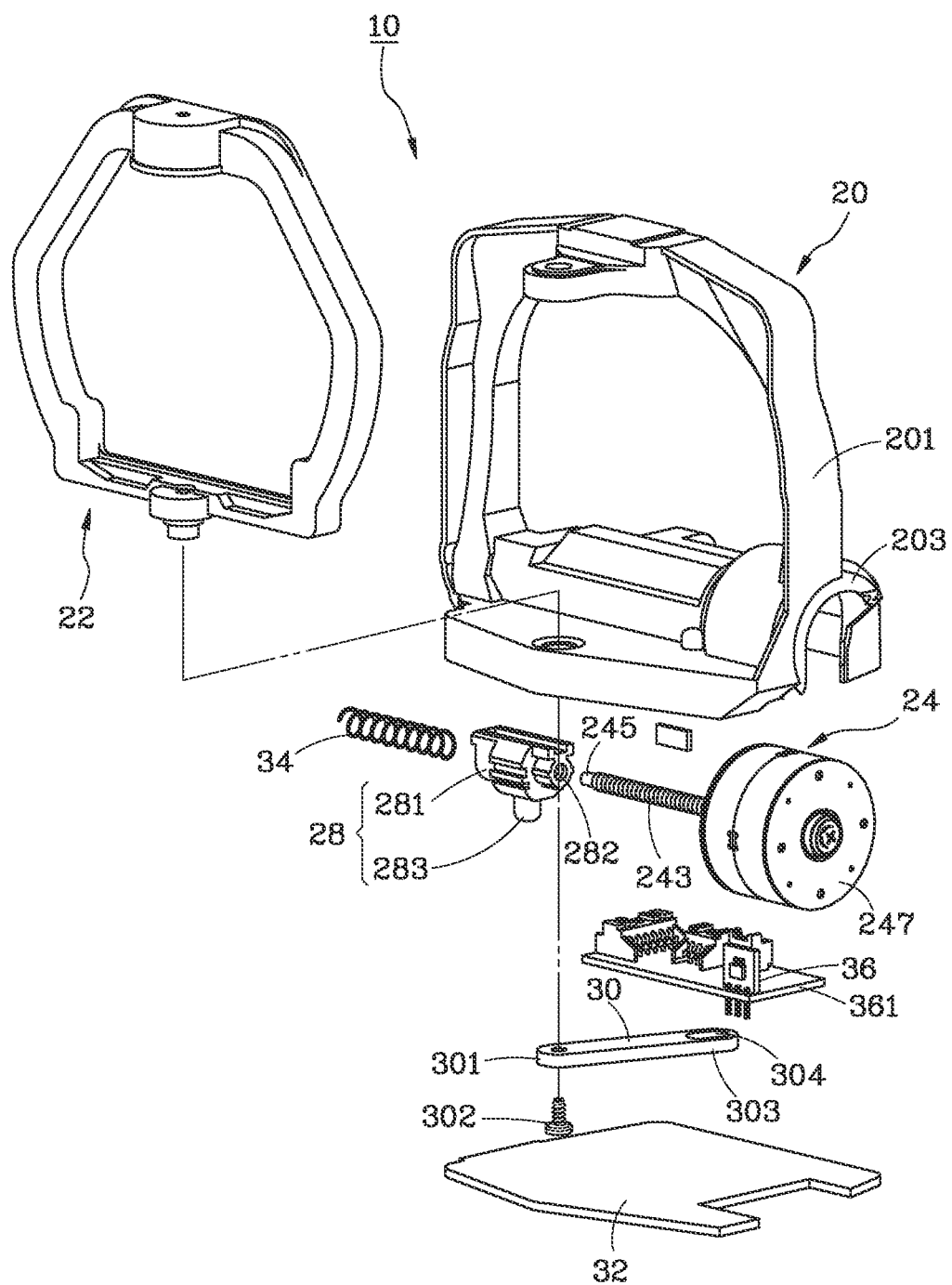
FIG. 2 is an exploded view of the motor vehicle headlight positioning device in accordance with the first embodiment of the present invention.
Figure 3:
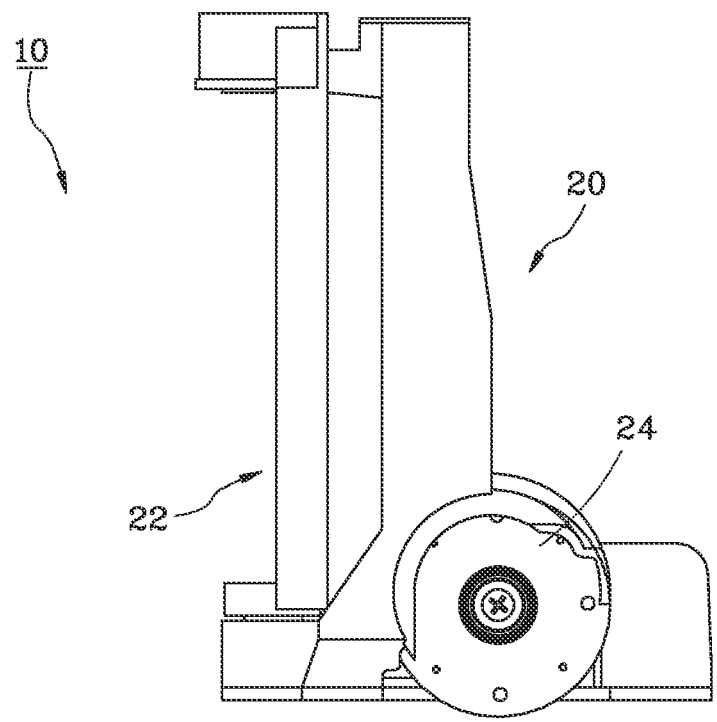
FIG. 3 is a side view of the motor vehicle headlight positioning device in accordance with the first embodiment of the present invention.

The advantages and features of the present invention will be fully understood by reference to the following two examples in conjunction with the accompanying drawings.

Referring to FIG. 1 through FIG. 4, a motor vehicle headlight positioning device 10 in accordance with a first embodiment of the present invention is shown. The vehicle headlight positioning system 10 comprises a holder base 20, a headlight support 22, a step motor 24, a movable member 28, a swivel arm 30, a bottom cover 32, a spring member 34 and a position sensor 36.

Figure 4:
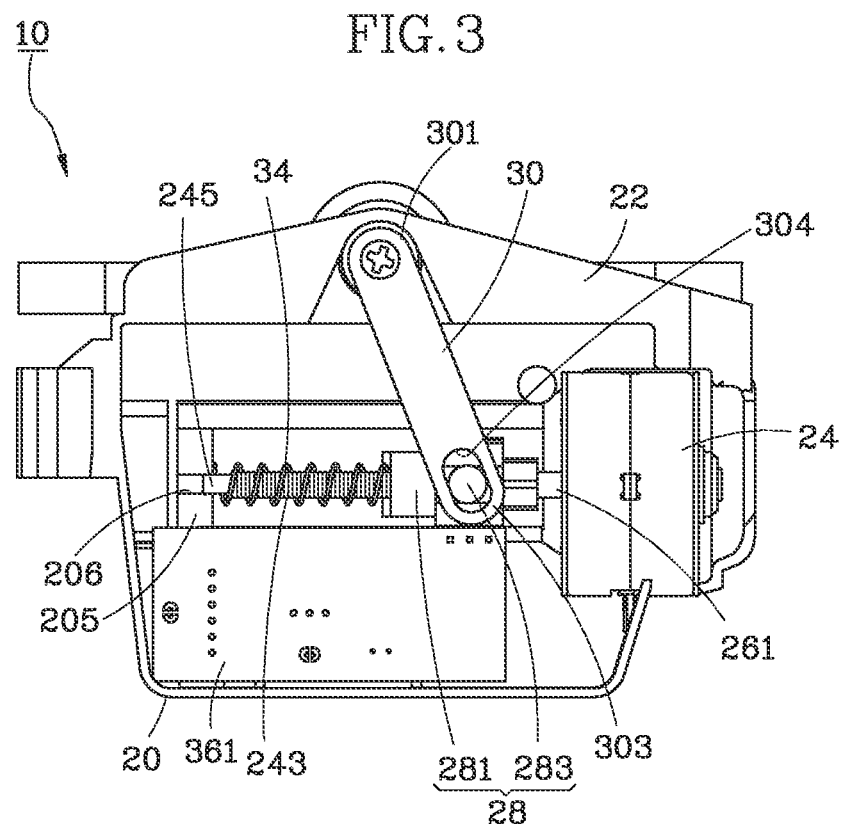
FIG. 4 is a bottom view of the motor vehicle headlight positioning device in accordance with the first embodiment of the present invention after removal of the bottom cover.

The holder base 20 comprises an open frame 201, a motor accommodation chamber 203, and a support 205 (see FIG. 4). The motor accommodation chamber 203 and the support block 205 are located on the bottom side of the open frame 201. The support block 205 comprises a locating hole 206.

The headlight support 22 is pivotally mounted in the open frame 201 of the holder base 20 for holding a headlight (not shown).

The stepping motor 24 is mounted in the motor accommodation chamber 203 of the holder base 20, comprising an output screw 243. The output screw 243 is rotatably mounted in the stepping motor 24 and prohibited from axial displacement, having a front bearing end portion 245 rotatably inserted into the locating hole 206 of the support block 205 of the holder base 20. The stepping motor 24 is adapted to output its rotary driving force through the output screw 243. In this embodiment, the output screw 243 is made by making threads on the output shaft of the stepping motor 24. Alternatively, the output screw 243 can be an independent member axially and fixedly connected to the output shaft of the stepping motor 247, achieving the same effects.

The movable member 28 comprises a body 281, a screw hole 282 formed in the body 281 and threaded onto the output screw 243 of the stepping motor 24, and a connection portion 283 extended from the body 281. In this embodiment, the connection portion 283 is made in the shape of an axle. Further, the body 281 has a sensible part (not shown) for position measurement.

The swivel arm 30 has opposing first end 301 and second end 303. The first end 301 is affixed to the headlight support 22 by means of a screw member 302. The second end 303 has a coupling hole 304 that is an elongated hole that receives the connection portion 283 of the movable member 28, enabling the second end 303 and the connection portion 283 of the movable member 28 to be coupled together.

The bottom cover 32 is covered on the bottom side of the holder base 20 to keep the stepping motor 24, the movable member 28 and the swivel arm 30 from being exposed to the outside.

The spring member 34 is sleeved onto the output screw 243, and stopped between the support block 205 of the holder base 20 and the body 281 of the movable member 28.

The position sensor 36 is carried on a PC board 361 and mounted with the PC board 361 in the holder base 20 for sensing the sensible part of the movable member 28 and generating an electronic signal indicative of the position of the movable member 28 in the holder base 20.

When going to adjust the projecting direction of the headlight, the user can directly operate the stepping motor 24 to rotate the output screw 243, causing the movable member 28 to move linearly along the output screw 243. Thus, the headlight support 22 can be driven by the movable member 28 and the swivel arm 30 to bias relative to the holder base 20, adjusting the projecting direction of the headlight.

As the output screw 243 is rotated on its own axis and the front bearing end portion 245 of the output screw 243 is supported in the support block 205 of the holder base 20, the displacement stability of the movable member 28 is enhanced, achieving optimal adjustment. Further, by means of abutment between the spring member 34 and the movable member 28, the clearance between the inner threads of the movable member 28 and the outer threads of the output screw 243 is minimized, enabling the rotary driving force to be accurately transferred to the movable member 28.

Figure 5:
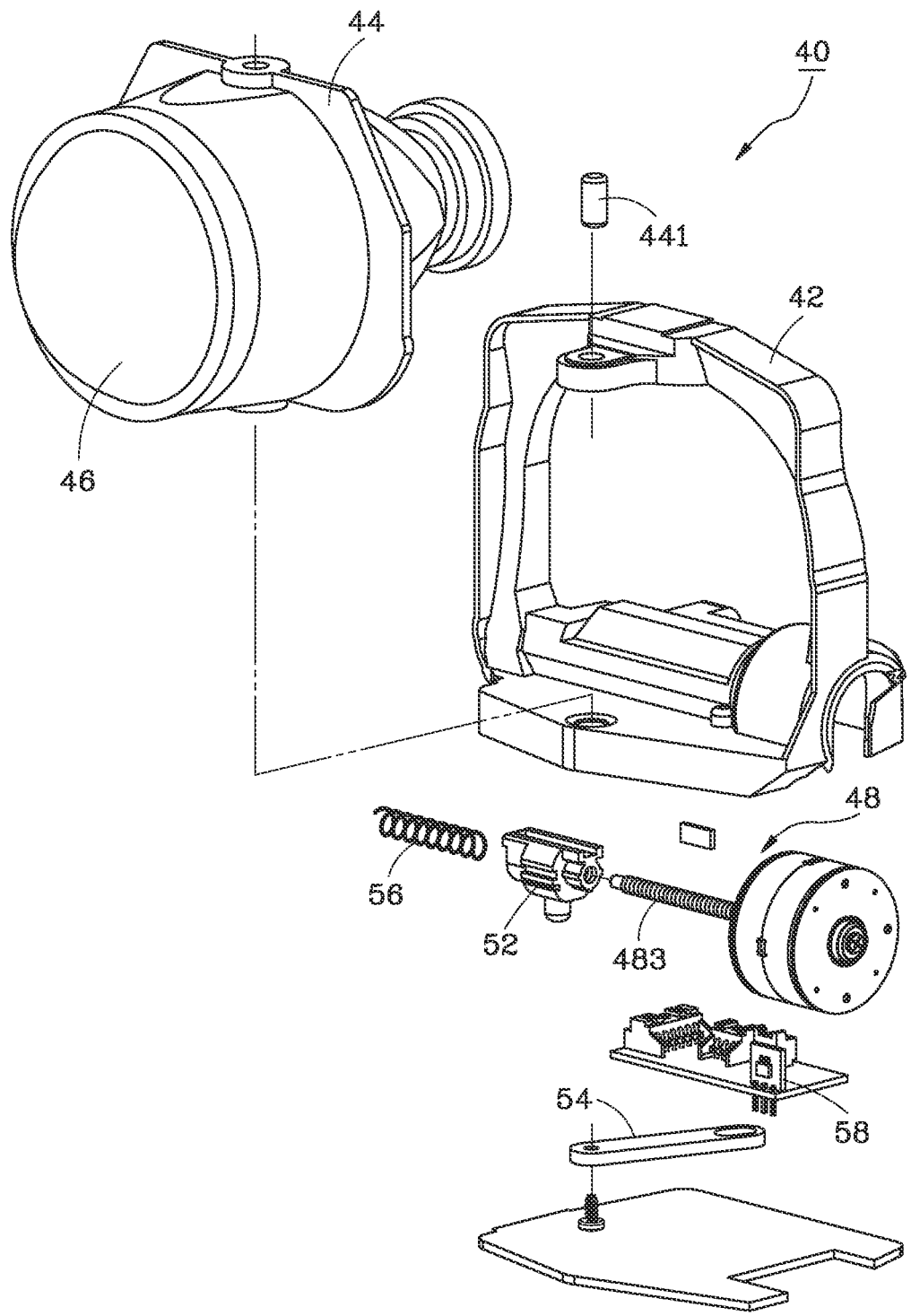
FIG. 5 is an exploded view of a motor vehicle headlight positioning device in accordance with a second embodiment of the present invention.

Based on the spirit of the invention, the motor vehicle headlight positioning device can be modified. FIG. 5 illustrates a motor vehicle headlight positioning device 40 in accordance with a second embodiment of the present invention. The motor vehicle headlight positioning device 40 of this second embodiment is substantially similar to the aforesaid first embodiment. The holder base 42, the stepping motor 24, the movable member 52, the swivel arm 54, the spring member 56 and the position sensor 58 of the motor vehicle headlight positioning device 40 of this second embodiment are identical to like component parts of the aforesaid first embodiment. When compared to the aforesaid first embodiment, this second embodiment is characterized in that the motor vehicle headlight positioning device 40 further comprises a headlight 46 that is integral with the headlight support 44. The headlight support 44 is pivotally connected to the holder base 42 by a central supporting pivot 441. Further, the headlight support 44 is not limited to the shape of an open frame. It can be variously shaped for connection between the headlight 46 and the holder base 42, allowing rotation of the headlight 46 relative to the holder base 42.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A motor vehicle headlight positioning device, comprising:
a holder base comprising an open frame and a support block mounted on one side of the open frame;
a headlight support pivotally mounted in said holder base;
a stepping motor fixedly mounted in said holder base opposite to said support block, said stepping motor comprising an output screw for outputting a rotary driving force, said output screw being rotatably mounted in said stepping motor and prohibited from an axial movement;
a movable member comprising a body meshed with said output screw and a connection portion extended from said body, said body having a screw hole threaded onto said output screw for moving linearly along said output screw; and
a swivel arm comprising a first end affixed to said headlight support and a second end rotatably and slidably coupled to said connection portion of said movable member; and
a spring member sleeved onto said output screw and stopped between said support block of said holder base and said body of said movable member;
wherein said holder base further comprises a locating hole located on said support block; said output screw comprises a front bearing end portion rotatably inserted into said locating hole of said support block of said holder base.

2. The motor vehicle headlight positioning device as claimed in claim 1, wherein said swivel arm comprises a coupling hole located on said second end; and said connection portion of said movable member is received in said coupling hole.

3. The motor vehicle headlight positioning device as claimed in claim 2, wherein said coupling hole of said swivel arm is an elongated hole and said connection portion is made in the shape of an axle.

4. The motor vehicle headlight positioning device as claimed in claim 2, further comprising a position sensor mounted in said holder base and adapted for sensing the position of said movable member in said holder base.

5. The motor vehicle headlight positioning device as claimed in claim 1, further comprising a headlight integrated in said headlight support.

* * * * *